(12) United States Patent
Wimsatt

(10) Patent No.: US 7,047,092 B2
(45) Date of Patent: May 16, 2006

(54) HOME AUTOMATION CONTEXTUAL USER INTERFACE

(75) Inventor: William Wimsatt, Littleton, CO (US)

(73) Assignee: CorAccess Systems, Golden, CO (US)

( * ) Notice: Subject to any disclaimer, the term of this patent is extended or adjusted under 35 U.S.C. 154(b) by 0 days.

(21) Appl. No.: 10/820,426

(22) Filed: Apr. 8, 2004

(65) Prior Publication Data

US 2004/0260427 A1    Dec. 23, 2004

Related U.S. Application Data

(60) Provisional application No. 60/461,307, filed on Apr. 8, 2003.

(51) Int. Cl.
    *G05B 15/00*    (2006.01)

(52) U.S. Cl. .............. 700/83; 700/17; 700/19; 700/20; 700/65; 700/276; 715/717; 715/740; 715/771; 345/2.2; 345/520; 345/173; 345/184

(58) Field of Classification Search ............ 700/11, 700/17–20, 65, 83, 275–278; 715/716, 717, 715/740, 764, 765, 767, 771–773; 345/156, 345/173, 184, 520, 1.1, 2.1, 2.2
See application file for complete search history.

(56) References Cited

U.S. PATENT DOCUMENTS

| | | | |
|---|---|---|---|
| 4,728,949 A | | 3/1988 | Platte et al. |
| 5,061,916 A * | 10/1991 | French et al. ............... 340/522 |
| 5,086,385 A * | 2/1992 | Launey et al. ............... 700/83 |
| 5,579,221 A * | 11/1996 | Mun ............................. 700/83 |
| 5,706,191 A | | 1/1998 | Bassett et al. |
| 6,192,282 B1 | | 2/2001 | Smith et al. |
| 6,208,341 B1 * | 3/2001 | van Ee et al. ............... 715/716 |
| 6,297,746 B1 | | 10/2001 | Nakazawa et al. |
| 6,351,693 B1 | | 2/2002 | Monie et al. |
| 6,389,124 B1 * | 5/2002 | Schnarel et al. ........ 379/142.01 |
| 6,434,447 B1 * | 8/2002 | Shteyn ........................ 700/245 |

(Continued)

OTHER PUBLICATIONS

M. Frank and J. Foley, Model-Based User Interface Design by Example and by Interview. In *Proceedings of the ACM Symposium on User Interface Software and Technology*, pp. 129-137, (Atlanta, Georgia, Nov. 3-5) 1993.

*Primary Examiner*—Anthony Knight
*Assistant Examiner*—Crystal J. Barnes
(74) *Attorney, Agent, or Firm*—Stuart T. Langley; Kent A. Lembke; Hogan & Hartson L.L.P.

(57) ABSTRACT

A user interface having a plurality of user interface elements including: background, passive elements such as frames and borders, information display elements that present information from application software operating on the control unit, and control elements that cause application software operating on the control unit to initiate programmed behaviors. The user interface as a whole is contextually sensitive in that the appearance of user interface elements (e.g., color, size, font, contrast, order, grouping, arrangement, etc.) and/or the behavior of user interface elements are varied in a manner that is dependent on the context of the control unit. The context of the control unit is represented by state information known to the control unit, which includes context-specific state information known to a particular control unit as well as global context information known to multiple or all control units in a system.

19 Claims, 11 Drawing Sheets

U.S. PATENT DOCUMENTS

| | | |
|---|---|---|
| 6,473,661 B1 | 10/2002 | Wollner |
| 6,593,856 B1 * | 7/2003 | Madau .................. 340/825.69 |
| 6,756,998 B1 * | 6/2004 | Bilger ........................ 715/764 |
| 6,826,551 B1 * | 11/2004 | Clary et al. .................... 706/46 |
| 6,844,807 B1 * | 1/2005 | Inoue et al. ................. 340/3.7 |
| 6,967,565 B1 * | 11/2005 | Lingemann ............ 340/286.02 |
| 2002/0013629 A1 * | 1/2002 | Nixon et al. .................... 700/4 |
| 2003/0033028 A1 | 2/2003 | Bennett |
| 2003/0071845 A1 * | 4/2003 | King et al. |
| 2003/0132949 A1 * | 7/2003 | Fallon et al. |
| 2004/0049577 A1 * | 3/2004 | Imhof |
| 2004/0216059 A1 * | 10/2004 | Vong et al. ................. 715/840 |

* cited by examiner

HOME AUTOMATION CONTEXTUAL USER INTERFACE

RELATED APPLICATIONS

The present invention claims the benefit of U.S. Provisional Patent Application Ser. No. 60/461,307 filed on Apr. 8, 2003 entitled Home Automation Control Architecture.

BACKGROUND OF THE INVENTION

1. Field of the Invention

The present invention relates, in general, to automation systems, and, more particularly, to software, systems and methods for implementing a contextual user interface for home automation systems.

2. Relevant Background

Home automation systems enable control of lighting, heating and air conditioning, window shades or curtains, pool heaters and filtration systems, lawn sprinklers, ornamental fountains, audio/visual equipment, and other appliances. Home automation systems include relatively simple systems that control one or a few functions in a home to more elaborate systems that control multiple, disparate features. Home automation systems may be integrated with a home security system so that when a fire alarm is raised, for example, internal and external lights will be turned on. Entertainment equipment such as audio, video, and home theatre equipment are available with control interfaces that enable a remote device to activate the equipment according to programmed schedules or remotely input commands.

In general, a home automation or control system comprises one or more controlled devices, one or more controllers, and a command communication link coupling a controller to a controlled device. The controllers may be directly programmable in which case they include some form of human interface for setting switches, event timing, and the like. Alternatively, controllers may be indirectly or remotely programmable in which case a separate human interface may be implemented by a personal computer or the like. Systems may be programmed using either a simple command language or using a graphical user interface that requires a computer with a monitor. These systems are expensive and require substantial investment by the user in time and energy to install and modify programming. To enter and/or change a program, a user must consult a user's manual or call a programming specialist. Hence, these systems are difficult to install and adapt to changing needs. Moreover, they are difficult to expand by adding new controlled devices or new software to add functionality.

The home automation market has been fractured because most of the automation control manufacturers address narrow, vertical market segments, and use proprietary interfaces to protect their market. For example, some leading control manufacturers offer systems that focus on heating, ventilation, and air conditioning (HVAC) systems control. These manufacturers have little interest in controlling lighting, security systems, entertainment systems, and the like as these markets are entirely foreign to them. Other manufacturers make, for example, home entertainment controllers that integrate various video and audio components, but the primary focus has been to offer integrated control over only their own components. As a result, consumers face an array of control systems that do not interoperate, and that have proprietary interfaces that are difficult to understand and program.

Some efforts have been made to provide integrated interfaces—single devices that "talk" to various control systems in a residence. One available system offers a rigid architecture that is easy to install because it offers few customization options, however, the rigid architecture limits its functionality. Other systems offer more flexible interfaces, but in each case the implementations include limitations that make the products expensive and/or difficult to install.

Server-based control systems involve a central control mechanism or server that issues commands to each of the controlled devices either directly, or through subordinate controllers. Server-based systems may be easier to program as the operator may need to be come familiar with a single program, but are more complex to install as each of the controlled devices must be coupled to and in communication with the central server. Moreover, because the server must be programmed to interact with the various controlled devices and/or subordinate controls, the operator must still become intimately familiar with the protocols and vagaries of each controlled device, defeating the advantages of a single software interface.

Another common limitation of control systems arises from the control interface of the controlled devices themselves. A typical controlled device will implement a single control interface for receiving commands from a controller. This single interface is usually restricted to a single signaling protocol that makes a subset of the controlled devices functions accessible to the controller. Hence, the controlled device is designed to interact with a single controller and is unable to interact with a plurality of controllers. Further, the functionality that can be implemented is restricted by the controller hardware and/or software and cannot be readily extended.

Hence, a need exists for a home automation and control architecture that is easy to install, easy to use, and at the same time flexible and extensible to accommodate new devices and new functionality.

SUMMARY OF THE INVENTION

A home automation and control architecture having a contextually relevant user interface. The user interface is generated on one of a plurality of control units located throughout a controlled environment such as a home or office building. Each user interface comprises mechanisms for presenting information (e.g., a visual display, audio output systems and the like) as well as mechanisms for receiving user input (e.g., touch screen input, mouse or other pointing device, microphones, cameras and the like). Automation and/or control application software executes on the control unit to communicate control information such as commands, sensor messages, status messages, and the like with other control units as well as controlled systems (e.g., security systems, entertainment systems, HVAC systems, and the like). The present invention involves two levels of contextual relevance: first, the user interface as a whole is contextually sensitive and second, interface elements within the user interface are contextually sensitive.

A user interface comprises a plurality of user interface elements including: background, passive elements such as frames and borders, information display elements that present information from application software operating on the control unit, and control elements that cause application software operating on the control unit to initiate programmed behaviors. The user interface as a whole is contextually sensitive in that the appearance of user interface elements (e.g., color, size, font, contrast, order, grouping, arrangement, etc.) and/or the behavior of user interface elements are varied in a manner that is dependent on the context of the control unit. The context of the control unit is represented by state information known to the control unit, which includes context-specific state information known to a particular control unit as well as global context information known to multiple or all control units in a system.

Moreover, individual elements are themselves made contextually sensitive. In a particular implementation, contextually sensitive interface elements include interactive screen elements such that a single screen element can simultaneously display information about the context (e.g., current temperature, sound volume, light level, etc.) as well implementing behavior to send messages to a controlled system that can affect change in the displayed information (e.g., a thermostat, an entertainment system, or a lighting subsystem). Preferably the context information is displayed in a graphical rather than textual form, and the behavior is implemented by interacting with the user interface element itself.

DETAILED DESCRIPTION OF THE PREFERRED EMBODIMENTS

Figure 1:
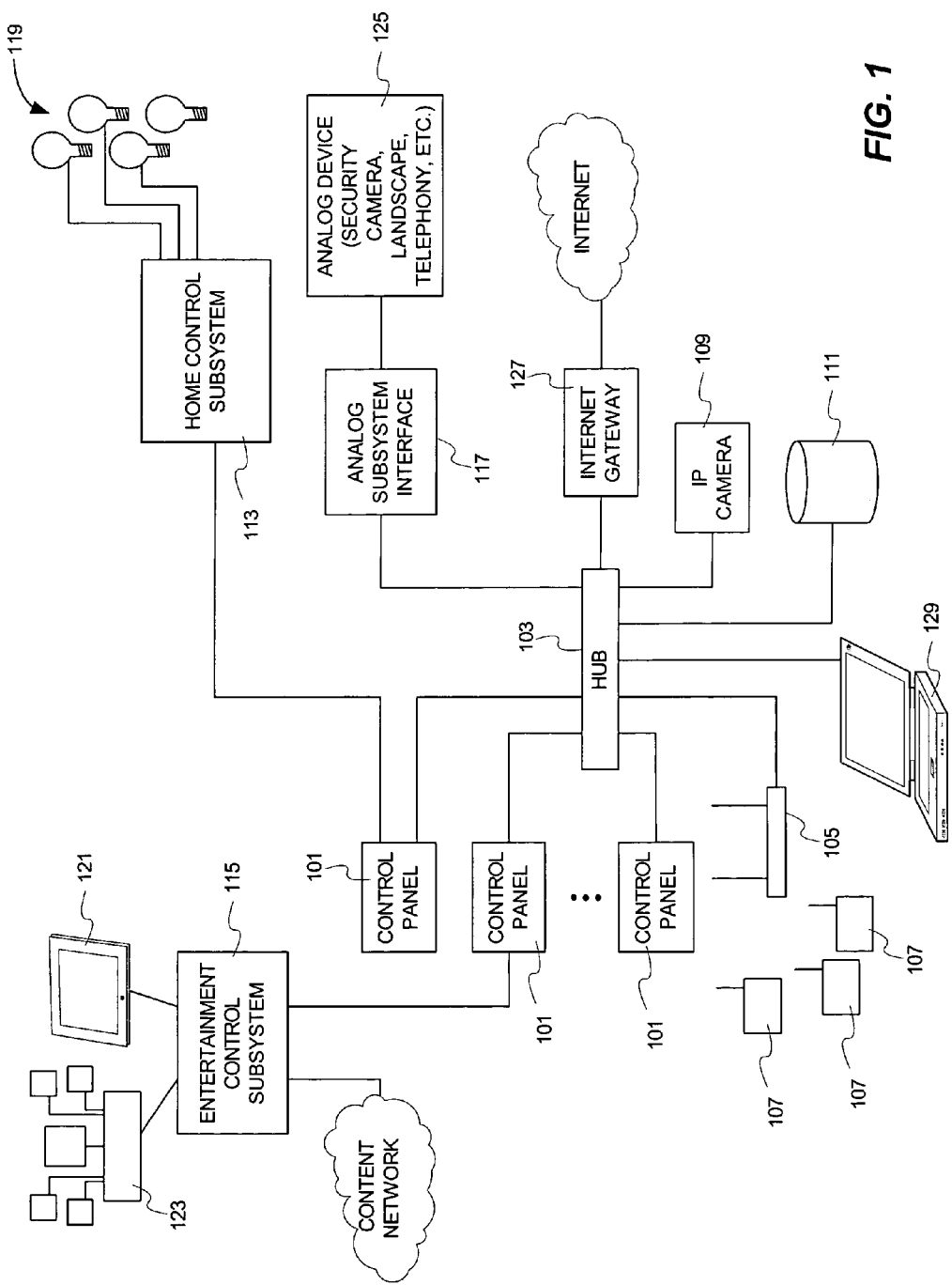
FIG. 1 shows an networked control environment in which the present invention is implemented.

In general, the present invention relates to systems and methods for implementing a contextual human interface to a control system. The particular examples involve a control panel that presents an interactive graphical user interface that generates commands typically related to operational commands to turn on/off a controlled device, adjust settings on a controlled device, query the status of a controlled device, and the like. The operational commands are communicated to a variety of controlled devices (e.g., fans, lights, media equipment and the like) that together make up a "controlled system". In accordance with the present invention, the human interface changes various features depending on the context in which the controlled system operates. These changes may involve altering the number and type of controls that are displayed, changing the size, color, or other features of a control, changing the focus of the graphical display, and the like.

The present invention is particularly useful in home automation environments because it builds on top of the vast array of controlled devices and subsystems that already exist for managing lighting, security systems, heating and air conditioning, window shades or curtains, pool heaters and filtration systems, lawn sprinklers, ornamental fountains, audio/visual equipment, and other appliances. Hence, while it is contemplated that the present invention may be adapted to handle special-purpose and proprietary controlled devices and subsystems, a particular advantage is that the present invention adapts to existing controlled devices and subsystems and leverages their advantages. In essence, the present invention provides human interface to a controlled system that abstracts the human interface organization from the physical interconnection to controlled devices.

The present invention is illustrated and described in terms of a distributed computing environment having nodes distributed throughout a building. However, an important feature of the present invention is that it is readily scaled upwardly and downwardly to meet the needs of a particular application. Accordingly, unless specified to the contrary the present invention is applicable to significantly larger, more complex network environments such as wide area networks (WANs), as well as small network environments such as conventional local area networks (LAN) systems or non-networked environments.

Unlike prior user interfaces for controlled systems, the present invention implements a contextual interface. A contextual interface is a product of a design process in which the various interface features are selected to improve the user's ability to operate the interface. Examples of interface features that can be controlled include the selection of controls, size, shape and position of controls, background and foreground color schemes, sounds, as well as the selection of actions that are initiated by operating a control. In most graphical user interfaces these items remain static so that irrespective of the context, a control such as a "start" button, remains in the same place on a display with the same appearance and performs the same function.

In contrast, the present invention provides an easily programmed user interface that can readily take into account the user's ongoing experience with the controlled system, the nature of a particular user's need to control portions of a controlled system, the impact the human interface has on the user, the status of the controlled system and components, and the like. This means that the human interface will appear and behave differently for every user, if desired. Similarly, the human interface may appear and behave differently in each installation depending on differences in the controlled system, and may appear and behave differently over time depending on current status of the controlled system.

More specifically, a user interface comprises a plurality of user interface elements including: background, passive elements such as frames and borders, information display elements that present information from application software operating on the control unit, and control elements that cause application software operating on the control unit to initiate programmed behaviors. The user interface as a whole is contextually sensitive in that the appearance of user interface elements (e.g., color, size, font, contrast, order, grouping, arrangement, etc.) and/or the behavior of user interface elements are varied in a manner that is dependent on the context of the control unit. The context of the control unit is represented by state information known to the control unit, which includes context-specific state information known to a particular control unit as well as global context information known to multiple or all control units in a system.

Moreover, individual elements are themselves made contextually sensitive. In a particular implementation, contextually sensitive interface elements include interactive screen elements such that a single screen element can simultaneously display information about the context (e.g., current temperature, sound volume, light level, etc.) as well implementing behavior to send messages to a controlled system that can affect change in the displayed information (e.g., a thermostat, an entertainment system, or a lighting subsystem). Preferably the context information is displayed in a graphical rather than textual form, and the behavior is implemented by interacting with the user interface element itself.

In this manner, a user interface may present elements that present information and enable control of lighting, security systems, entertainment center and HVAC system to adult users. In contrast, a child user is presented only entertainment center controls and information. Further, passive elements such as backgrounds and frames may change color and/or shape and/or size based on the specific user or a group to which the user belongs. Similarly, the behavior of a user interface control may be altered depending on the user or a group to which the user belongs. One user may prefer a light control to implement a simple on/off whereas another user may desire the light control to implement a dimmer.

The present invention contemplates a user interface that is sensitive to a wide variety of contextual information beyond user identification. In one implementation, when a security system is triggered indicating a fire, intruder, or other hazard, passive elements such as backgrounds and borders change color or flash to alert the user of the condition. Likewise, when a controlled system (or a portion of the home automation system itself) fails or otherwise becomes unavailable a change in color of passive elements may be used to alert the user to the condition. In the particular examples the user interface may contain the same set of controls during the hazard/failure condition, or the set of controls may be changed to become more relevant to the current situation (e.g., lighting controls and entertainment system controls become unavailable during the condition).

In another example, tripping a zone on a burglar alarm, which may indicate a household member entering the house, causes the control units to display a security screen having controls that allow the alarm to be de-activated by entry of a valid code so that the time and stress of navigating to the security screen is avoided by automatically adapting to the new context. Once a valid security code is entered into any control panel, each control panel can return to the user interface that was presented before the alarm event, thereby automatically adjusting to the current context information of that control unit.

From a programming level, a contextual interface works cooperatively with graphical user interface (GUI) components. For example, in a typical architecture a data processor communicates with a set of GUI processes. The GUI processes implement screen buffers and the like for translating information from a data processor into one or more arrays of pixels that can be displayed to a user. Likewise, the GUI processes may receive information form a pointer device such as a mouse, for receiving user input.

The present invention alters this conventional architecture with layer of interpretive processes that run on top of the GUI processes, altering the display of information and altering how the data processor responds to user input based on contextual factors. In this manner, the contextual interface of the present invention allows the human interface to communicate more effectively with a user by enabling the presentation of information in a way that is adapted to the particular sensitivities of a user. As a simple example, a child may be more responsive to vibrant colors and cartoon-like animation whereas an adult may be more responsive to soothing tones and subtle graphics. A contextual interface to a control system can provide a simple light switch with an interface that presents a light on/off control in different ways to match the particular sensitivities of a user. These differences are not only aesthetic as they increase the usability and often the functionality of the human interface. This capability becomes increasingly useful as the number, variety, and complexity of the controls increases.

FIG. 1 shows an exemplary control environment in which the present invention is implemented. A plurality of control panels 101 implement a programmable human interface in the particular embodiment. Control panels 101 are conveniently implemented using computer industry standard components and software to the extent practical, although special purpose, non-standard components and software are a suitable equivalent in particular applications. In a particular example, control panels 101 comprise variants of a personal computer (PC) architecture to take advantage of price and performance features of the personal computer market. Control panels 101 are mounted throughout a building at locations where it is convenient or desired to exercise control over controlled systems. For example, a control panel 101 can be provided in each bedroom of a house, as well as a kitchen, office, entertainment areas and the like. Alternatively, one or two control panels 101 may be provided in central locations for shared access by all members of a household.

As a particular example, the Companion™ 6 and Companion™ touch-screen interface units produced by CorAccess Systems of Golden, Colo., assignee of the present invention, are suitable implementations for control panels 101. These devices implement a touch-screen graphical user interface and are compact flat screen devices that are readily wall mounted. These devices have suitable computing power and resources to implement a variety of applications for exercising home automation and control functions contemplated by the present invention.

A hub 103, such as a conventional internet protocol (IP) hub, provides a network interconnection between control panels 101 and other devices. Hub 103 may be implemented as a hub, router, switch, access point, or similar device that couples network devices. While IP transport is used in the particular implementations described herein, other standard and/or proprietary transport protocols are suitable substitutes. For example, Ethernet®, Fibre Channel, and other transport protocols may be appropriate in particular installations. Hub 103 may implement any number of ports to meet the needs of a particular application, and may be implemented by a plurality of physical devices to provide more ports and/or a more complex network including subnetworks, zones, and the like.

In addition or alternatively, the present invention may be implemented using wireless networking components such as a wireless access point/router 105 and wireless control panels 107. When used in combination with a wired network, access point 105 may be coupled to the network via hub 103. Alternatively, access point/router 105 may implement the hub/router/switch functionality to replace hub 103 altogether. Wireless control panels 107 implement similar functionality to control panels 101 and may be implemented by devices such as a Mobile Companion™ or Mobile Companion™ X available from CorAccess Systems. Wireless control panels 107 may also be implemented by a variety of wireless general-purpose computing devices such as laptop computers, handheld computers, palm computers and the like as well as special purpose devices provided in the form of, for example, remote controls, key fobs, smart cards, and the like.

Several basic types of controlled devices are shown in FIG. 1. First, controlled devices may be directly connected to the network via, for example, hub 103. For example, an IP camera 109 comprises a camera that implements its own IP interface. A variety of security, telecommunications, environmental sensors, and the like are available with suitable IP interfaces. These controlled devices communicate control messages with a network-coupled control panel 101 or 107.

A second type of controlled device is coupled to a particular control panel 101/107 through a subsystem interface. For example, one control panel 101 couples to a lighting control subsystem 113 to control lights or lighting systems/devices 119 while another control panel 101 couples to an entertainment control subsystem 115 to control video device(s) 121 and audio equipment 123. The subsystem interfaces comprise, for example, a control device that is provided with a particular third-party subsystem that may have a special-purpose or proprietary signaling protocol. The control panel 101 couples to the subsystem interface using the physical, electrical, and signaling protocols adopted by that subsystem. For example, a serial connection such as an RS-232 or RS-485 connection is used in many cases.

Alternatively, a subsystem interface may couple with hub 103 such as the case with analog subsystem interface 117. A variety of controlled devices are available such as security cameras, landscape controllers, telephony devices, HVAC systems, and the like 125 that do not communicate using standard computer protocols. An analog subsystem interface 117 implements control functions to the extent possible with such devices 125 and provides a network interface for coupling to other systems. An example of such a system is a variety of X10 devices and controls marketed by X10 Wireless Technology, Inc. of Seattle, Wash.

The present invention also contemplates implementing shared services and/or resources such as shared mass storage 111 and internet access services through an internet gateway 127. Mass storage 111 may be coupled via hub 103, or may be directly coupled to one or more control panels 101/107. Internet gateway 127 may couple to hub 107 or may be integrated with hub 103 when implemented as a router or access point. Internet gateway 127 may implement a hardware and/or software firewall or other access control mechanisms for increased security.

Optionally, one or more conventional personal computers 129 may be coupled to the network as well via hub 103 and/or wireless access point 105. In addition to implementing function similar to control panels 101/107, a personal computer 129 may implement applications that are not installed on or readily executable by control panels 101/107. Additionally, personal computer 129 may implement common applications and/or computationally intensive applications such as word processing, web browsing, database access, and the like using conventional software.

In operation, the system shown in FIG. 1 enables controlled many-to-many access between each control panel 101/107 and any of the controlled devices or subsystems. In prior home automation systems an entertainment control system was essentially stand alone, and could be accessed through a dedicated human interface that enabled control over audio equipment 123 and video device 121. A separate, independent system with a separate human interface would be required to control lighting, or security systems, for example.

In contrast, the present invention enables any control panel 101/107 (or PC 129) to send a control message relevant to any particular controlled device. Each control panel 101/107 is aware of controlled devices and subsystems that it can directly access, and implement a message broker process that listens for control messages relevant to those devices/subsystems. The message broker processes interpret the command messages and generate appropriate device-specific signaling to implement a command on the controlled device or subsystem. Similarly, status signals from controlled devices are interpreted and the message broker process generates network-compatible control messages that are distributed to the control panels 101/107. In this manner, any control panel 101/107 can communicate control information with any controlled device or subsystem without requiring detailed knowledge of the particular interface and signaling requirements of that controlled device or subsystem.

Another feature of the present invention involves system discovery processes implemented in control panels 101/107. When a control panel 101 is coupled to a controlled device or subsystem, it interrogates that device or subsystem to learn details of the control interface of that particular system. Many special purpose subsystems support such interrogation to various degrees, and such interrogation will often provide sufficient detail to enable full access to even proprietary control interfaces. This interrogation may simply be a matter of determining the controller type in which case the control panel 101 can look up a command set and signaling protocol information for that controller type. Alternatively, the interrogation may reveal more details about actual commands that are available. In some cases, a controlled device or subsystem will return insufficient information during interrogation in which case the control panel can be manually or semi-automatically programmed to support that controlled device or subsystem.

Because control panels 101/107 speak a common language amongst themselves, once a single control panel 101/107 discovers a particular controlled device or subsystem, that information can be readily shared with any other control panel 101/107. In most cases it is not necessary for every control panel 101/107 to have detailed knowledge of a particular controlled device or subsystem. Instead, it is sufficient to be aware of the existence of each controlled device and the functionality available from that device. For example, details of entertainment control subsystem 115 are often not important so long as information about audio system 123 and its functions (on/off, signal source, volume control, status, etc.) are made available.

Figure 2:
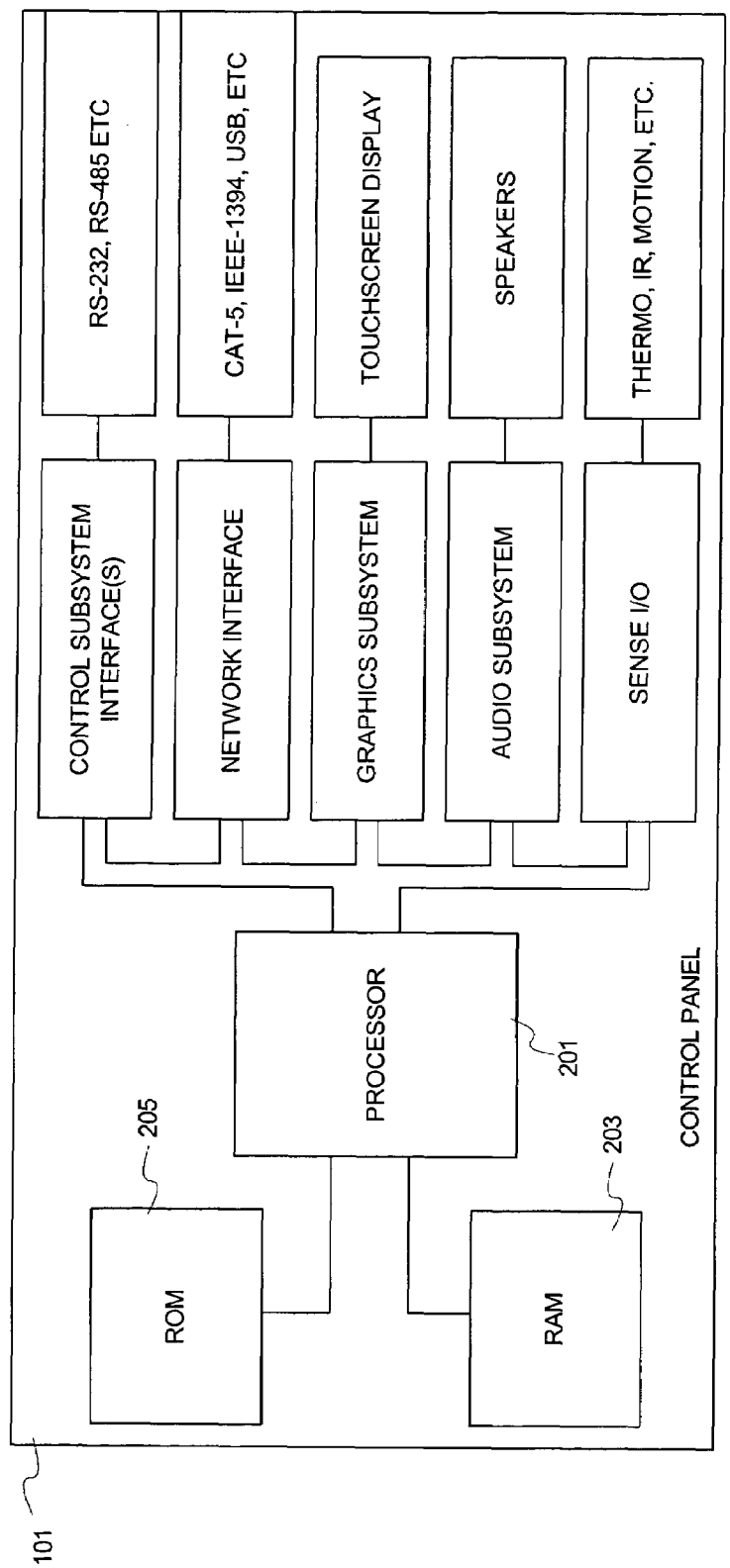
FIG. 2 illustrates a hardware-oriented view of a control panel device in accordance with the present invention.

FIG. 2 illustrates a hardware-oriented view of a control panel 101 in accordance with the present invention. A control panel 101 is powered by AC or DC power source although power supply and distribution are not shown in FIG. 2 to ease understanding of the present invention. A processor 201 implements data processing functionality for accessing and manipulating data from various subsystems and memory. Memory such as random access memory 203 and/or read only memory 205 may be provided as separate devices or integrated with processor 201. Processor 201 may be implemented, for example, by a Pentium® class processor provided by Intel Corporation, or the like. By using general purpose, widely available processor components a wide variety of operating system and application software is available, and new applications are easily developed. Alternatively, some processor architectures such as the Super-H licensed by SuperH, Inc. and StrongArm processors provided by a variety of manufacturers support integration of various functions such as serial interfaces, network interfaces, graphics subsystems, audio subsystems, and the like which may provide cost and/or performance benefits in some applications.

The various subsystems shown in FIG. 2, including serial interfaces, network interfaces, graphics subsystems, audio subsystems, and sensor I/O, are exemplary only as additional subsystems may be useful in some applications, whereas some of the illustrated subsystems may not be required. Processor 201 is coupled to various subsystems using any available connection technology such as a peripheral component interconnect (PCI) bus or the like.

Control subsystem interface(s) comprise one or more interfaces that support connection and communication with subsystems 113 and 115 in FIG. 1. These would be typically implemented as serial interfaces coupling to, for example, an RS-232, RS-485, and/or universal serial bus physical connections. Any number of such interfaces may be provided in a control panel to meet the needs of a particular application.

A network interface implements the resources required to support packet communication over, for example, a CAT-5, IEEE-1395, or USB connection. These functions are substantially similar to what might be found in a convention personal computer network interface card (NIC).

A graphics subsystem preferably supports an LCD panel display and touch-screen functionality. Alternatively, other graphical user interface I/O technology can be substituted in particular applications. LCD panels provide low power, convenient displays with long life and form factors that are amenable to wall mounting, and so are desirable in many applications. In applications where a GUI is not desired, a graphics subsystem can be greatly simplified by substituting driver electronics for LED and push-button human interface components.

Optional audio subsystem may be provided to drive integrated speakers. Similarly, some sensory I/O may be desired to sense room temperature, or motion detectors to sense activity in proximity with a control panel 101. Sensory I/O may be omitted where desired, or provided through a serial connection, or provided through a the network in a manner similar to other controlled devices and subsystems.

Figure 3:
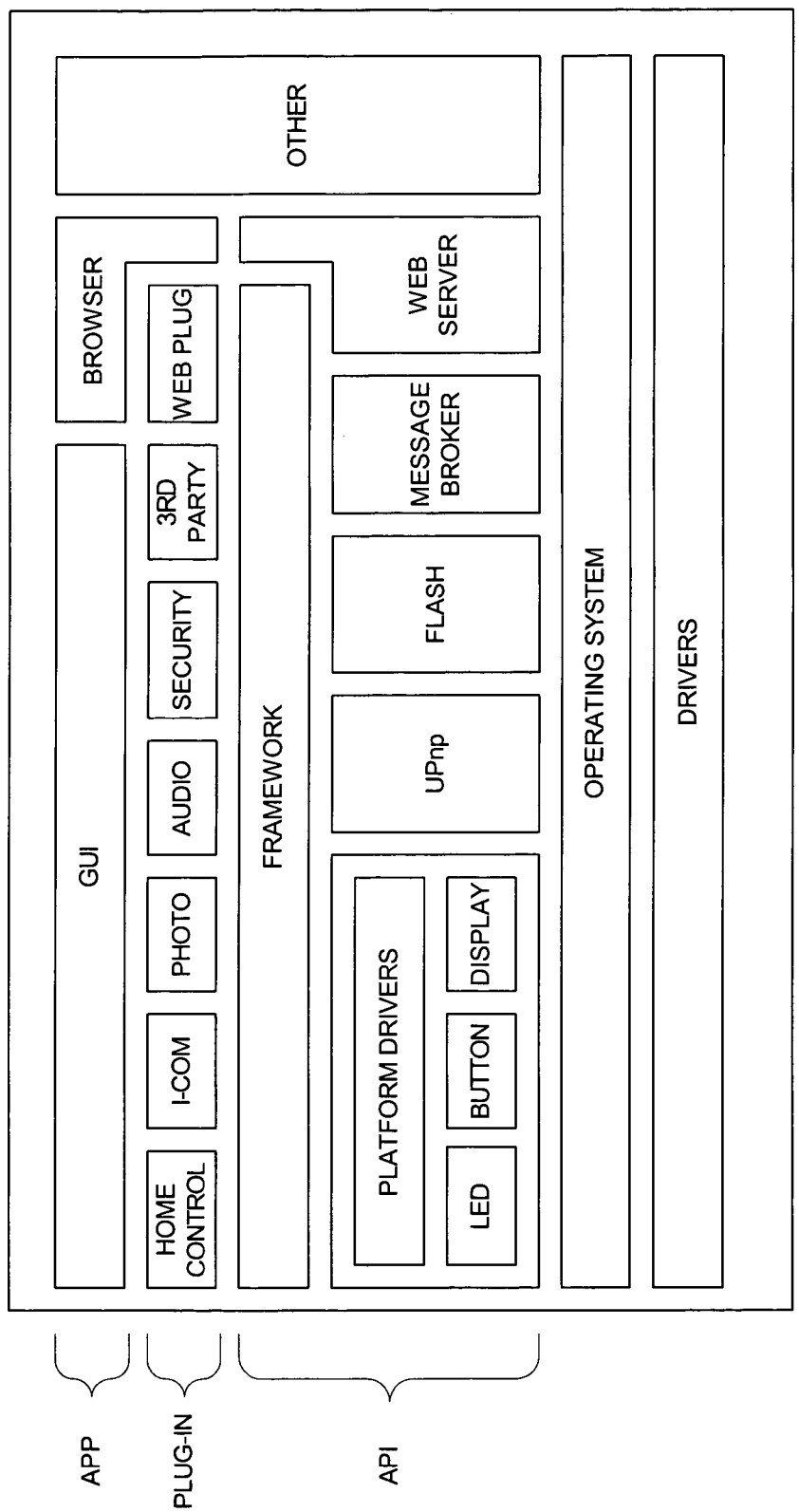
FIG. 3 illustrates a logical view of processes implemented by a control panel device in accordance with the present invention.

FIG. 3 illustrates a logical view of processes implemented by a control panel 101 device in accordance with the present invention. The drivers layer interfaces with the various hardware components shown in FIG. 2. Drivers may be added and removed from the drivers layer to support additional or updated functionality. Operating system layer may be provided by any available operating system, although it is useful to have an operating system that has a relatively small resource consumption such as Linux 2.4, Windows CE® or the like.

The application programming interface (API) layer comprises various processes that provide access to OS services and augment OS services for use by particular applications. Universal Plug-and-Play (UPnP™) processes support common protocols and procedures intended to enhance interoperability among network-enabled PCs, appliances, and wireless devices. Flash processes implement services related to Macromedia® FLASH programming environment and extensions. The particular implementation also includes web server processes such as provided by Xitami® web server products.

Platform drivers are similar to hardware drivers, but offer more complex and platform specific functionality for devices such as hardware switches, LED indicators, and an LCD display. In particular implementations, the API layer includes driver libraries for accessing and operating hardware functions that are somewhat unique to a particular control panel 101/107. By making these drivers accessible to application plug-ins, the tasks involved in developing new plug-ins are greatly simplified. It becomes unnecessary to have intimate, detailed knowledge of how to turn on an LED or detect a switch activation, for example, because the built-in driver library can handle the details of these tasks.

An important feature of the API layer is a message broker that provides services that coordinate communication between the various other API layer and application layer processes. The message broker component includes processes for listening to control messages, including command and status messages, and parsing those messages to determine which processes, if any, in that control panel 101/107 are involved in handling the control message. For example, a control message that is received externally and indicates a command to sound an alarm at that control panel 101 will be passed to an audio and/or security application plug in. A command message relating to turning on/off a light fixture may be passed to a home control plug in, or may be ignored if it relates to a fixture that is not coupled to that control panel 101. Similarly, a status message indicating that a light fixture is turned on may be formed into a message directed to one or more other control panels 101/107 that have interest in the status of that light fixture. The message broker can use, in particular embodiments, available mail protocols and the like to send notifications to external systems or recipients as well as communicating in network messages to other control panels 101/107.

Sophisticated configurable functionality is implemented by application layer and plug-in components. In a particular configuration, control panel 101 implements a native GUI that interfaces with various special-purpose plug in components. Each control panel 101 may have a distinct set of plug-in components to meet the needs of the particular room or environment where the control panel 101 is installed. Further, the set of plug-in components can be changed based on specific user preferences. For example, a children's room may not normally use access to a home security system, however, when that same room is used as a guest room security system access may be enabled by installing a security plug-in. Similarly, the functionality of each component can be altered to increase or decrease the functionality based on the current user of the control panel, or the time of day, or other configurable permissions bases.

Exemplary plug-in components include a home control component that is designed to interface with one or more controlled devices or subsystems. An intercom plug-in provides intra-building communications and/or interface to a telephony system. A photo plug-in handles accessing and displaying photographs, video, or other content while an audio plug-in enables controls that can play audio files on the control panel 101 and/or control audio equipment 123 shown in FIG. 1. Security plug-in monitors status of a home security system and may enable features of the security system to be enabled/disabled under user control or programmatically. Any number of third party plug-ins are possible to implement extended functionality and/or enable access to new types of controlled devices and subsystems. Third party plug-ins are designed to comply with the API layer, or in some cases may interact with the operating system directly as suggested by the component labeled "OTHER" in FIG. 3.

Various plug-in components are enabled to communicate with each other through the message broker component as well as communicating with other control panels 101/107 and controlled devices and subsystems. For example, a security plug-in may monitor status of a home security system and when an anomaly is detected, activate the audio and home control plug-ins to provide information and/or alerts to users. Moreover, the security plug-in may override and close certain applications such as a photo player plug-in or audio plug-in to disable activities that might distract from the security plug-in's activities.

Optionally, a browser user interface is provided to supplement the native GUI interface. So much software and plug-in functionality is available for common browser GUIs such as Mozilla, Internet Explorer, and the like that it may be useful to provide a browser interface and web plug ins to perform certain functions that augment and/or replace various other plug-ins. It is contemplated that a system may be provided that will eliminate the native GUI and plug-ins entirely and use only a browser interface with a suitable plug in to the API via web server processes in the API.

The contextual user interface features of the present invention are implemented within the framework portion of the API, and within various plug-in application components. In a particular embodiment, plug-in application components implement human interfaces as Macromedia® Flash™ movies. "Macromedia" and "Flash" are trademarks or registered trademarks of Macromedia, Inc. in the United States and other countries. A user interface essentially presents a series of linked images where the links are defined by the user to implement desired functionality. The movie progresses in response to user inputs and changes in status of the controlled system. The application-level plug-ins define controls that are presented at a particular time and in a particular context, where the controls will initiate programmed responses and actions when activated by a user. The application-level plug-in components receive context information from the framework, and respond to this contextual information according to their programming. The context of the control unit is represented by state information known to the control unit, which includes context-specific state information known to a particular control unit as well as global context information known to multiple or all control units in a system. Preferably, the plug-in components are authored to receive and respond to certain context information in a manner that reflects the context information to the human interface that is displayed.

Figure 4A:
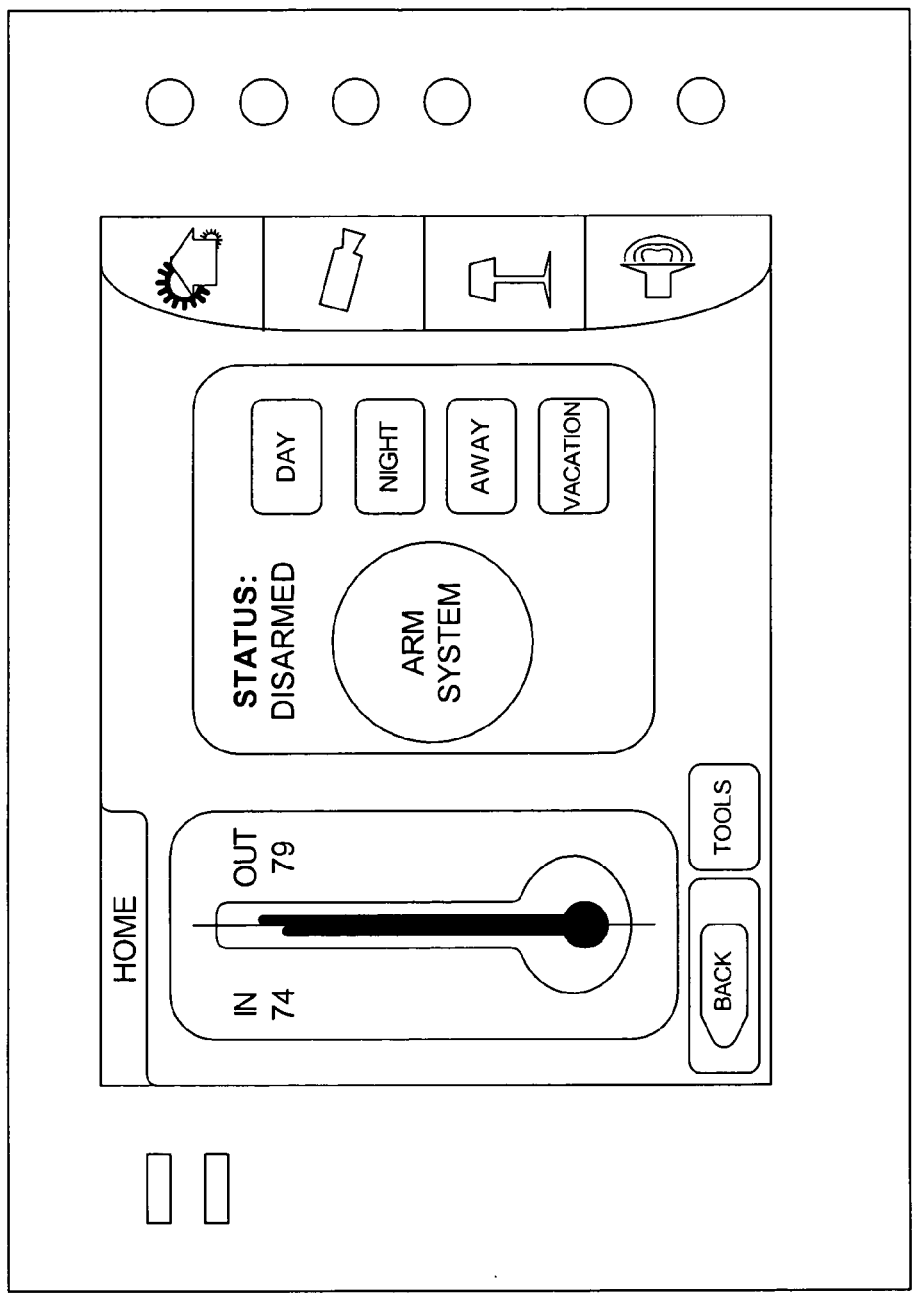
FIG. 4A–4F show exemplary user interface flows illustrating operation in accordance with the present invention.

FIG. 4A shows a "home" screen that would be, for example, the normal state of a control panel 101 from which other control functionality can be reached. The exemplary home screen includes a thermostat display indicating room temperature and/or outside temperature, either of which may be measured by the control panel 101 itself, or be obtained from a remote device or other control panel 101. The home screen also includes a display of the security system status, which in FIG. 4A is not armed. The security system status includes various control buttons labeled "day", "night", "away" and "vacation" that are used to transition to other screens used to program and operate the security system.

Common user interface elements include a series of buttons on the right-hand side of the display that initiate a transition to other screens. For example, the upper button iconically indicates a "control center" and when operated will cause a transition to a control center screen shown in FIG. 4B. A thermometer icon identifies a button that initiates a transition to a HVAC control screen. A lamp icon identifies a button that initiates a transition to a lighting control screen, while a speaker icon identifies a button that initiates a transition to the media control screen. The choice and selection of the buttons to be displayed on the home screen is readily adapted to a particular application, and those shown in FIG. 4A are provided for illustration only. Desirably, each screen includes some navigational buttons such as the "back" button in FIG. 4A. Also, each screen may provide a "tools" button that initiates a transition to a screen used to configure and manage the system and/or control panel 101 itself (e.g., adjust contrast, update software, and the like).

Figure 4B:
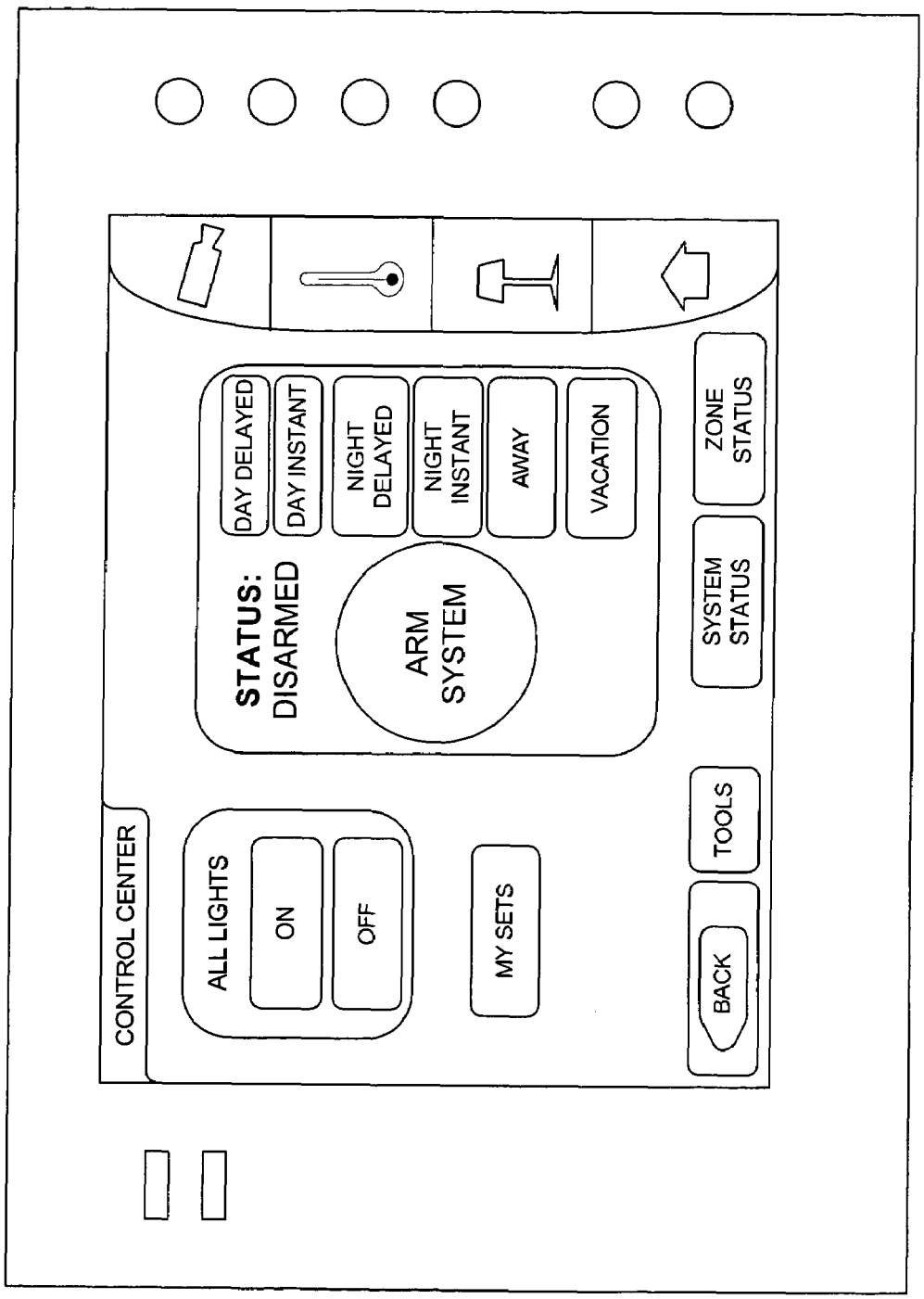

Upon activating the control center button in FIG. 4A, the control center screen shown in FIG. 4B is presented. As can be seen by comparison of FIG. 4A and FIG. 4B, there is a common design theme between the screens, although each screen presents a contextually relevant set of controls. For example, the control center screen no longer needs to display a control center button, and so that button is "replaced" with a button bearing a "home" icon which, when activated, initiates a transition back to the home screen shown in FIG. 4A. The control center screen provides controls and display graphics showing a different set of detail and enabling a different set of functionality than the home screen shown in FIG. 4A.

Figure 4C:
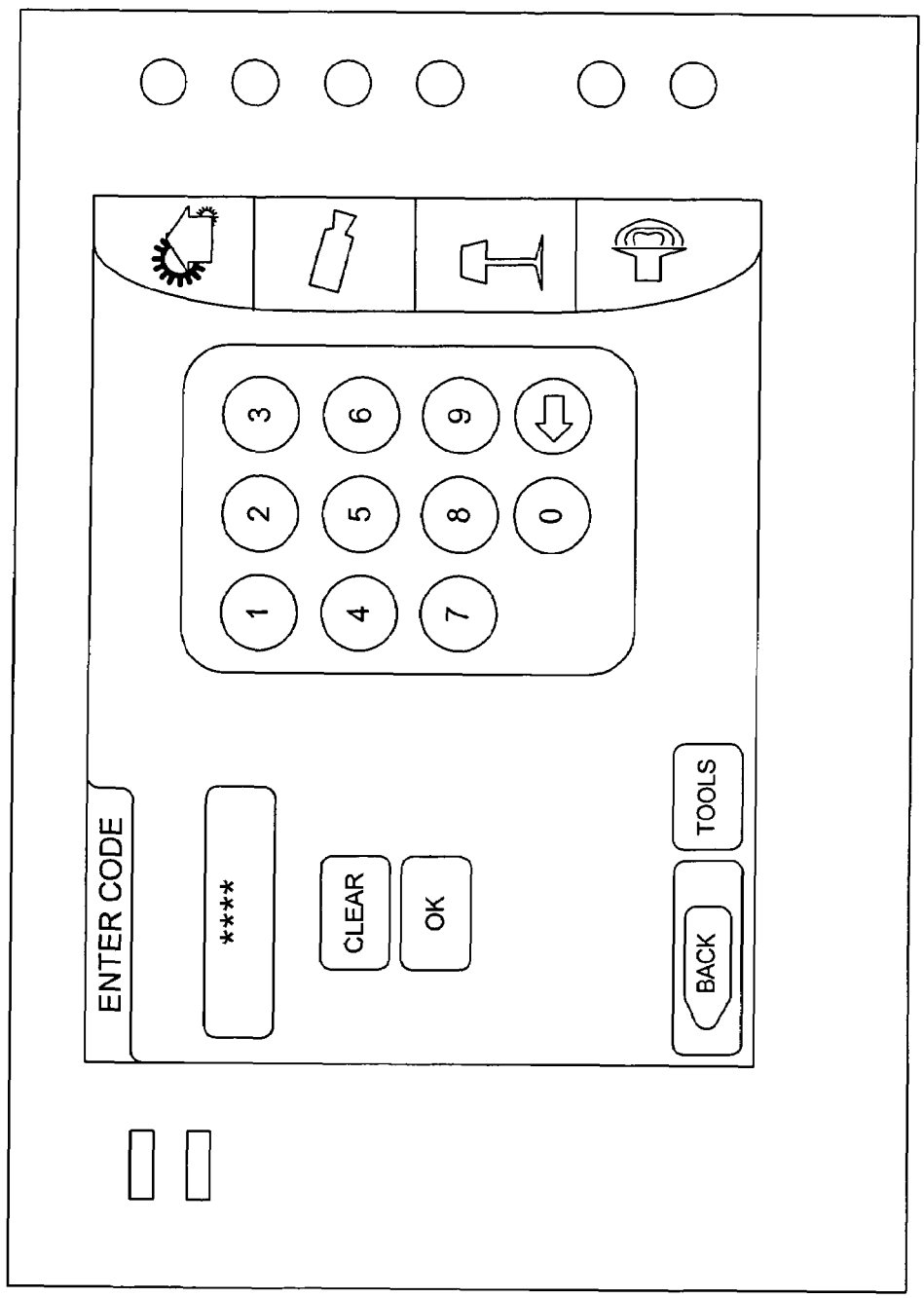

Upon activating the "away" button in either FIG. 4A or FIG. 4B a series of screens related to activation of a security alarm is initiated. In FIG. 4C, an "enter code" screen is presented to prompt the user to enter a security code in addition to a number of "standard" controls located in the right hand side of the screen. Again, the set of standard controls presents a consistent design with respect to placement and graphics, but some of the control functions may change to present controls that are more relevant to the context of entering a pass code to arm a security system. FIG. 4C illustrates the great flexibility enabled by the graphical display of the present invention in that a familiar numeric keypad is implemented for entering a security code. The numeric keypad is not useful for many other functions such as turning on lights or playing music, but it is contextually relevant to the task of arming a security system. Similarly, alphanumeric or symbolic keypads may also be presented as desired. When a proper code is entered, the entry may be validated against a stored code by the security subsystem, or may be validated using processes within the control panel 101 itself. In this manner, the present invention can both extend existing security features as well as implement security features that do not exist in the underlying controlled system.

Figure 4D:
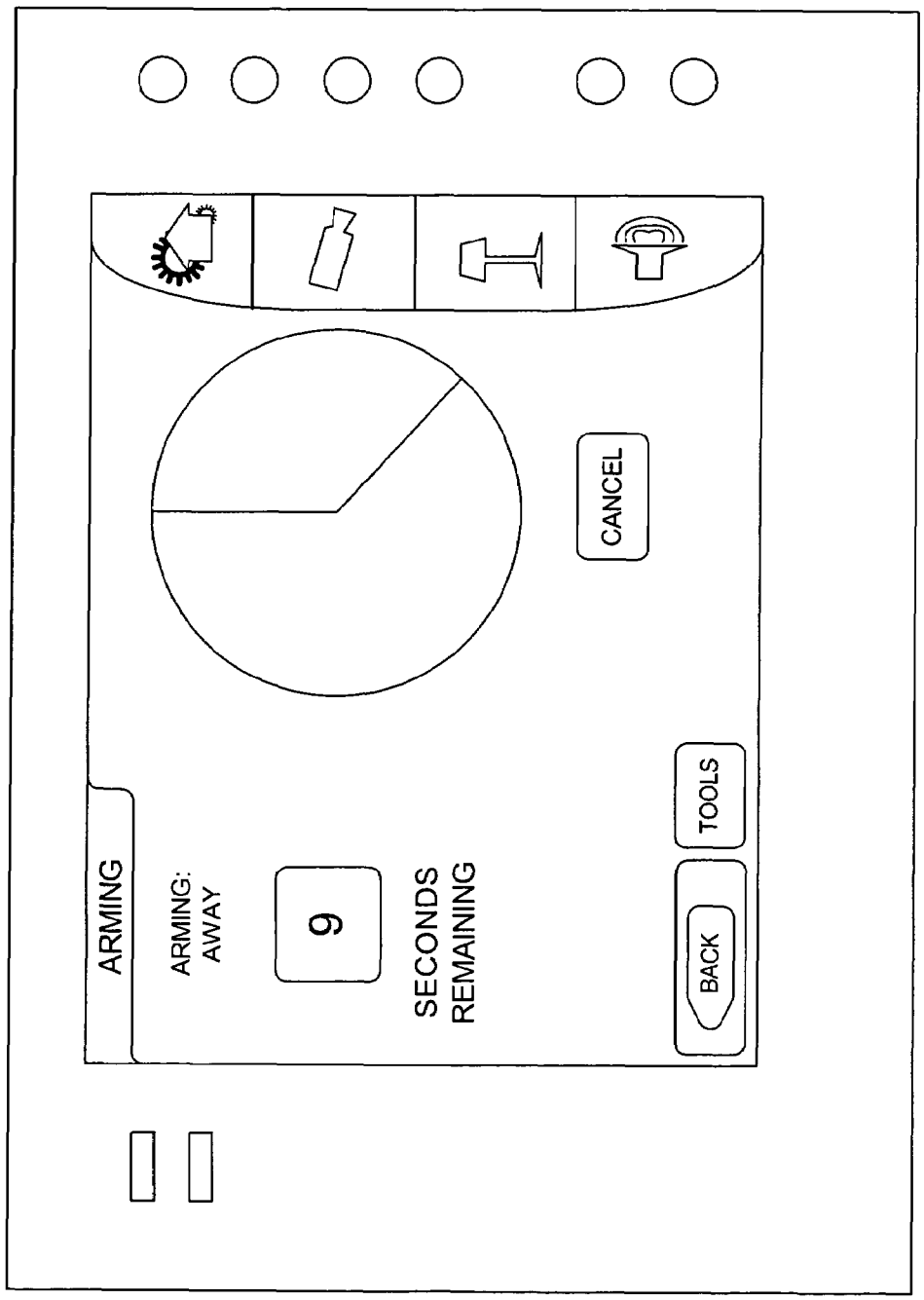
Figure 4E:
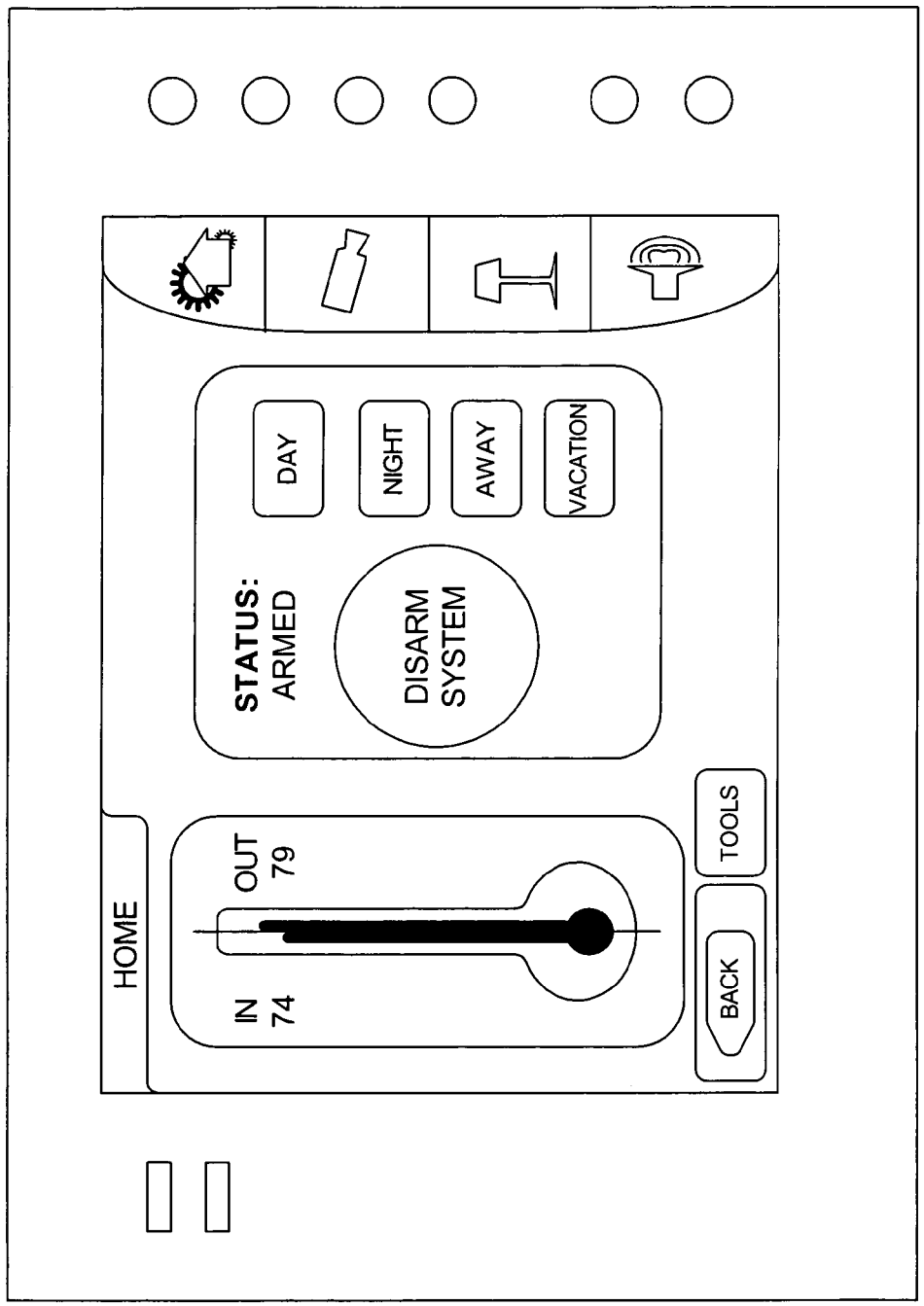

Upon entry of a valid code, the system transitions to the "arming" screen shown in FIG. 4D. Again, the arming screen includes very contextually relevant information including graphical elements that clearly communicate that the alarm system is arming. Because the control panel 101 can present programmable, animated graphics, it becomes possible to present information, like an alarm countdown, using graphical techniques not possible in prior systems. FIG. 4D illustrates that in many automation tasks, the user interface requirements for entering information may vary significantly from the user interface requirements for displaying status information. Prior systems were forced to compromise to make a single interface that served both functions. However, the present invention allows the screen to retrain common, contextually-relevant features while altering components as needed to support both entering and displaying information. Upon activation of the alarm, the system transitions back to the home screen in the particular example. However, the home screen now appears as shown in FIG. 4E with updated information concerning the alarm status. Additionally, some elements may change color, size, or shape to indicate the new status graphically. For example, the disarm system graphic appears red in the particular example whereas the "arm system" graphic appears green in FIG. 4A.

Figure 4F:
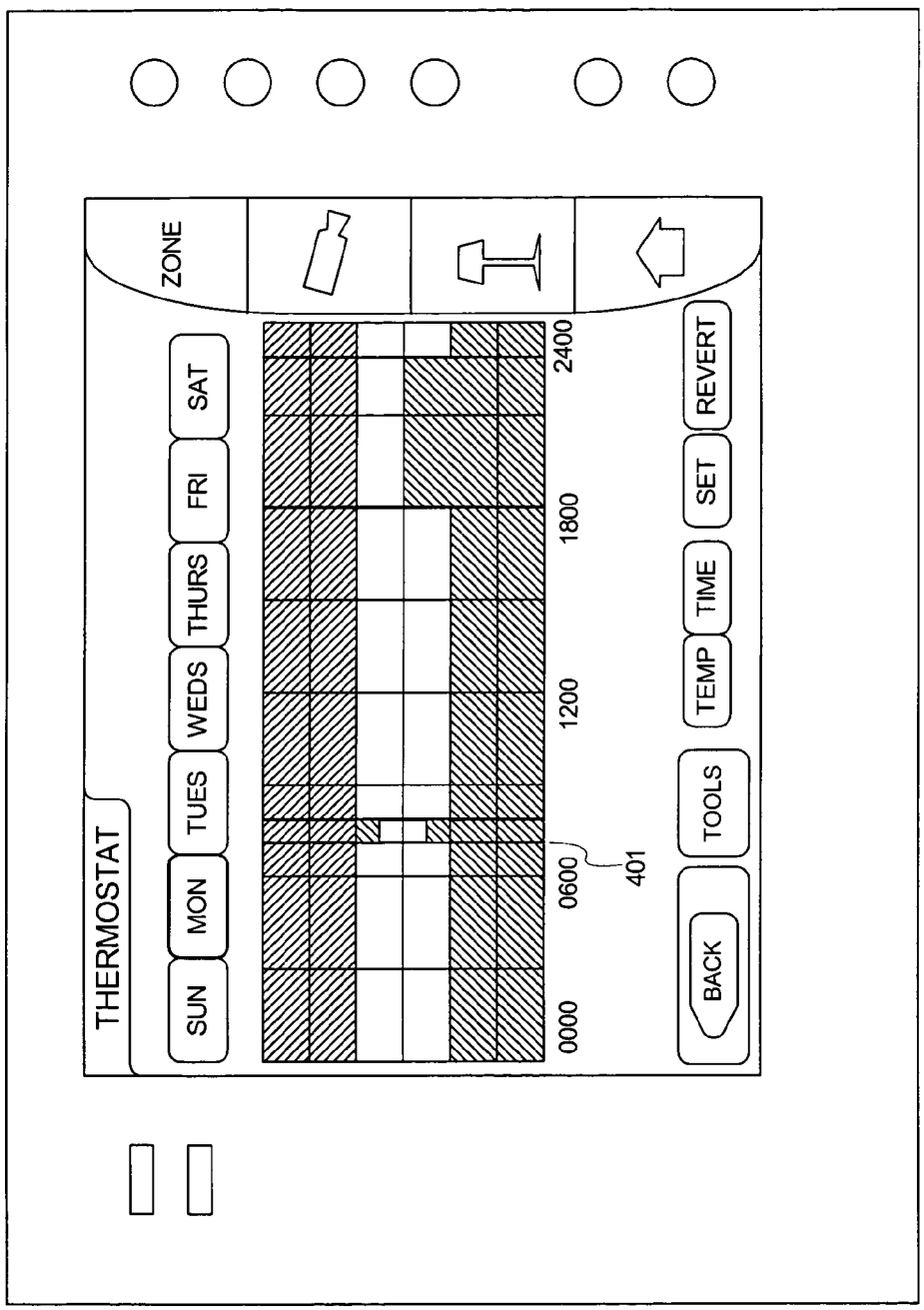

FIG. 4F illustrates another screen that relates to thermostat and HVAC scheduling, a common home and office automation task. In the particular implementation, the screen shown in FIG. 4F is reached by touching the thermometer graphic on any screen, but may be linked to by other paths as well. Unlike merely setting a thermostat, HVAC scheduling is a somewhat complex task as it involves numerous set points that may change over time for both cooling and heating systems. The familiar programmable thermostat in many homes allows a user to define time spans during a day or week, then to apply thermostat settings to each time span. Other systems use alphanumeric keyboard entry to define time spans and thermostat settings. These devices do not enable a user to visualize the settings over a span of time (e.g., a day) which makes the task more difficult. Moreover, keyboard entry of program settings is laborious and difficult to adjust as desired.

In the screen of FIG. 4F, the scheduling task is benefited by both the graphical display of information, and the ability for users to manipulate and enter data using the graphical screen. For example, spans of time can be defined by touching and dragging vertical indicators 401. Temperature set points can be established in any of the zones by dragging the color bars to a desired level within the zone. Prior automation system user interfaces can not or do not enable users to interact in this graphical manner to actually enter scheduling information. A similar interface can be used with lighting, sound volume, and other controlled devices that the user desires to vary over time according to a schedule.

Figure 5:
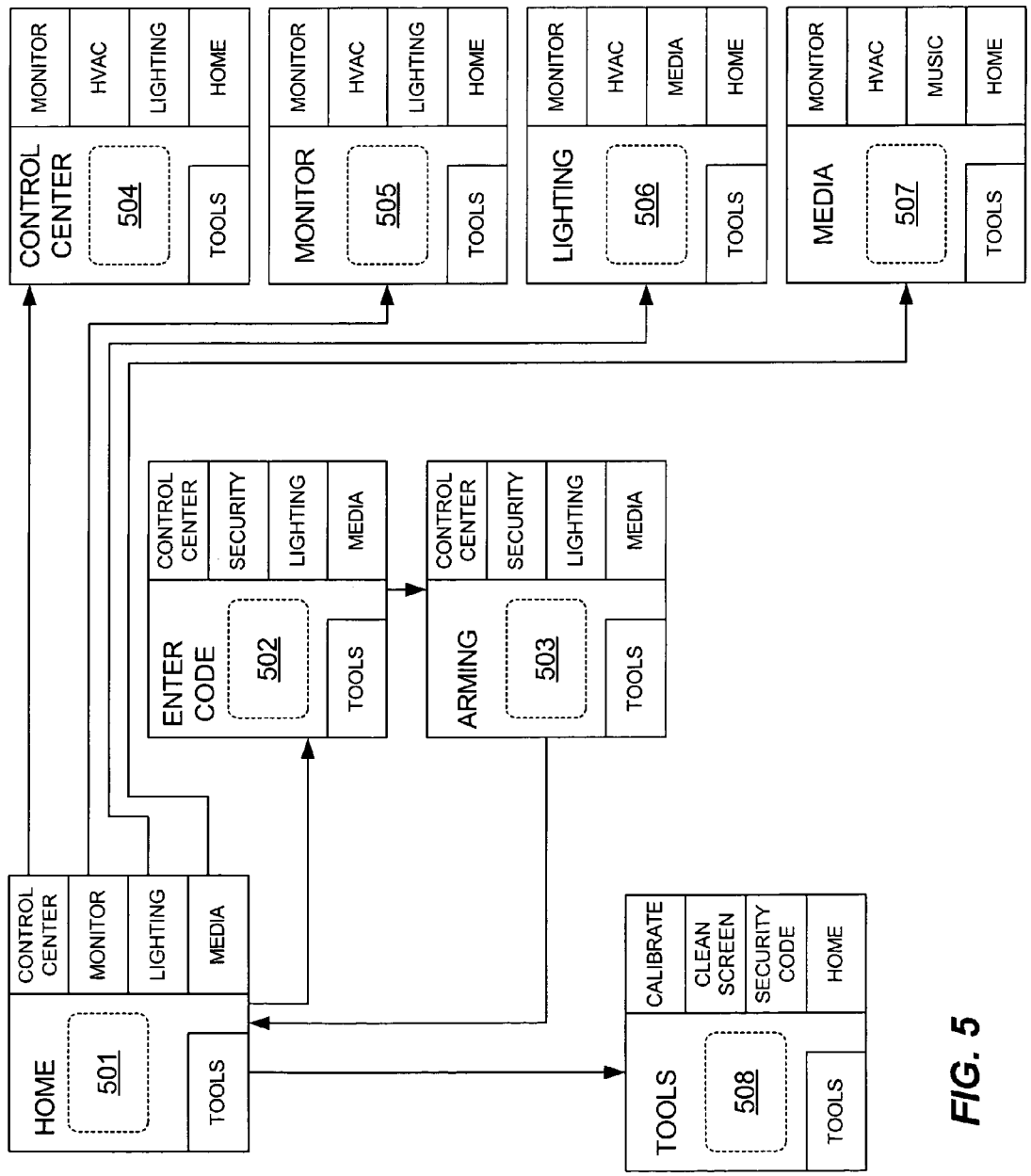
FIG. 5 illustrates an exemplary screen flow using a simplified representation of user interface screen.

FIG. 5 illustrates an exemplary screen flow demonstrating how the present invention enables transitions from one screen to another screen in response to either user input or system events. A typical system may involve tens or hundreds of linked screens. Beginning with the home screen, each of the control center, monitor, lighting and media button initiate a transition to a particular screen. The user returns to the home screen by activating the "home" control on any given screen, or by system events such as a time out that cause a screen to automatically transition back to the home screen. The tools button initiates a transition to a tools screen that presents various tools for calibration, setting preferences, and the like. It should be apparent that not all of the screen-to-screen links are shown in FIG. 5 to ease illustration and understanding. For example, in any given screen a control labeled "media", which is presented in many screens, would link to the media control screen shown in the lower corner of FIG. 5.

Each screen shown in FIG. 5 includes common design elements as well as screen-specific or context-specific portions 501, 502, 503, 504, 505, 506, 507, and 508. Each of these context-specific areas includes controls that display context-relevant information and/or enable a user to select context-relevant functions which will in turn initiate any number of other screens. For example, context area 501 in the home screen includes a control that displays thermostat information and, when activated, launches an HVAC scheduling screen such as shown in FIG. 4F. Context area 501 also includes alarm system information indicating current status of the alarm system as well as control, which when activated, initiate a transition to the enter code screen as shown in FIG. 5.

The context-sensitive area 502 in the enter code screen includes controls as described in reference to FIG. 4C and the arming screen includes controls as described in reference to FIG. 4D. Upon completion of the arming processes, the system initiates a transition back to the home page where the context-specific controls and graphics are updated to indicate the new state of the alarm system. This transition to the home page is an example of an "unsolicited" transition (i.e., a transition that is initiated by a system event or status change rather than by an explicit user input).

Referring now to the monitor screen, context specific area 505 includes a media player that displays input streaming from one or more monitor cameras such as IP camera 109. Exemplary controls that may be useful in this context include a control to switch cameras, move a camera, focus a camera, switch between tiled and non-tiled views of multiple input streams, record the camera view, and the like. The context specific area 506 of the lighting control screen may include controls for selecting various lights throughout a building, turning the selected lights on and off, dimming lights, and scheduling times for light operations. The media screen includes a context specific area 507 that may include, for example, controls for selecting various media sources (e.g., music CD, radio, or an external source, DVD, tape, television, slide show, and the like). These individual device selections will, in many cases, launch further screens that are specific to the operation of the selected device. The media screen in FIG. 5 also includes a control linking to a media library or other network attached resource for storing media files. As with the HVAC and lighting applications, the media screen may implement scheduling functions to record/play media files according to a schedule executed at one or more times in the future.

Figures 6, 7:
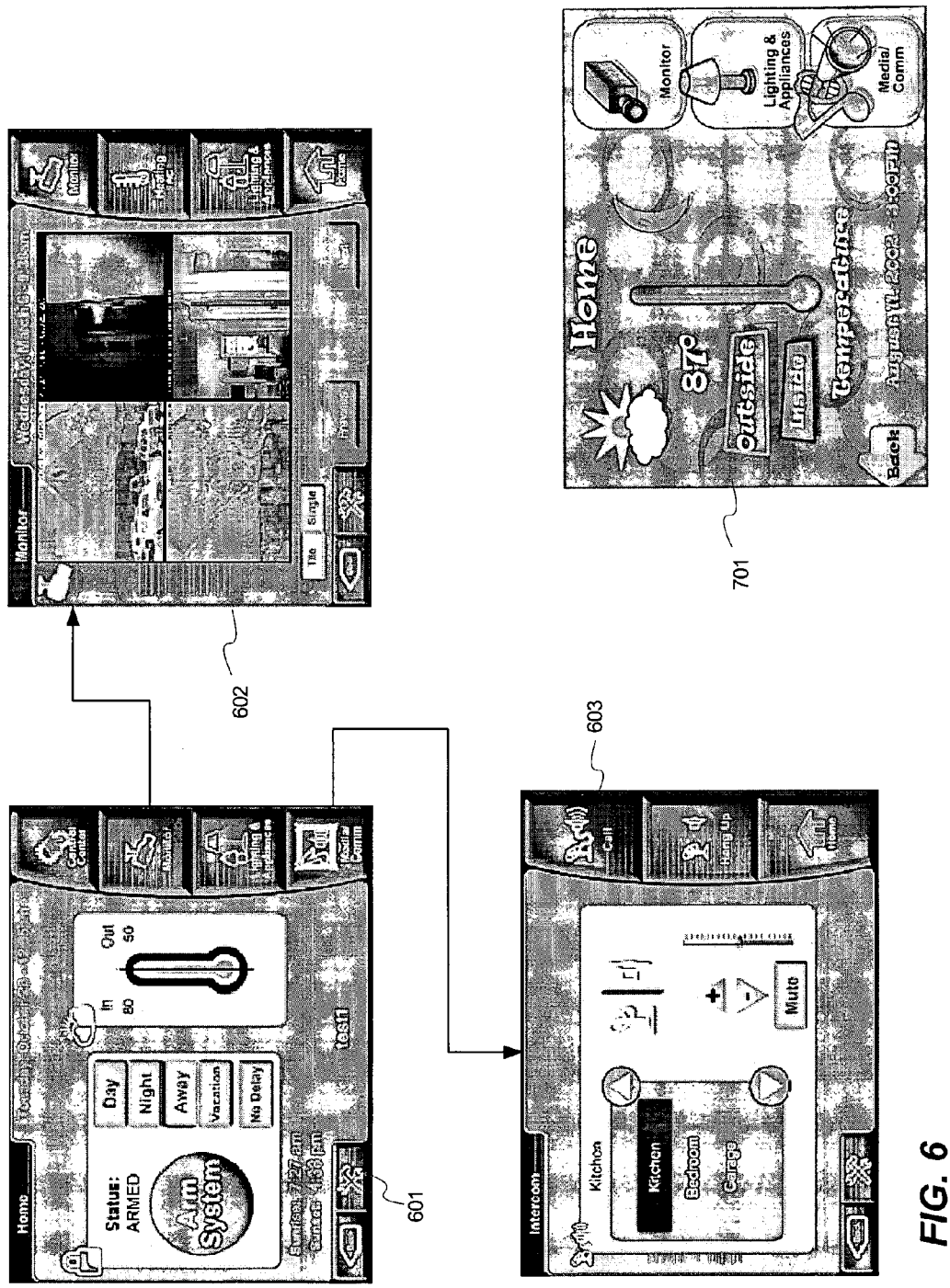
FIG. 6 illustrates in story-board format an exemplary screen flow illustrating transitions of a user interface in accordance with the present invention.
FIG. 7 shows a specific an alternative version of the graphical user interface of FIG. 4A in a new context.

FIG. 6 illustrates a flow of interface frames that is initiated and controlled by explicit user interaction with the human interface. FIG. 6 is similar to FIG. 5 but instead shows an actual screen implementation to illustrate the role of color and contrast (indicated by shading) in presenting the contextual user interface. In FIG. 6, the "home" view 601 presents general information such as current room temperature, date, time, and the like. In the particular example, the home view presents current status of a controlled security subsystem. The particular choices for what is displayed in a home view are selected to meet the needs of a particular application.

The "arm system" control is presented on a color display while the system is unarmed, and switches to red during when a security system is armed. In this manner the user interface uses color to communicate global context information (i.e., arming status of a security subsystem). Also, the user interacts with the interface by touching or tapping the "arm system" graphic illustrating how a single interface element both conveys context information in a graphical manner while simultaneously implementing behaviors that enable a controlled subsystem to affect changes related to the context information that is displayed.

When a user selects a "monitor" control on the home interface, the movie progresses to a presentation of security camera views, and a set of controls that are specific to the context of viewing and monitoring the security cameras. Alternatively, when the user selects a "media" control on the home display, the movie progresses to an entirely different presentation of controls and information related to a controlled media subsystem. Again, the particular selection of which controls are presented in each view is for example only. What the present invention implements is an ability for a user to explicitly control the progression of a movie where each movie presents a unique, contextually relevant view of the controlled system and subsystems.

As in the example of FIG. 5, activating graphical elements can initiate a screen change as well such as changes to screens 602 and 603 which present new context-specific information. In the particular implementation, some or all of the graphical elements in screens 602 and 603 simultaneously present context (i.e., state) information and implement behaviors that affect controlled systems and controlled subsystems. For example, the screen element that is displaying a camera view in screen 602 may be selected by the user to cause a behavior such as moving or focusing the camera. The slider control in screen 603 presents volume information using a blue color in the lower portion of the slider control and simultaneously enables a user to change the volume by moving their finger along the interface element. The interface element then interacts with a media control application executing on a control panel to send a control command either directly to an amplifier (e.g., a controlled subsystem) or to another control unit that is capable of directly controlling the amplifier.

FIG. 7 illustrates how the entire graphical interface may be implemented in a context sensitive manner. View 701 shown in FIG. 7 is substantially equivalent to the home view 601 shown in FIG. 6, although the appearance is dramatically different between the two implementations. View 701 presents substantially the same set of controls, each with behavior that is similar to the controls in home view 701 and which are implemented using the same library program code. The view 701 is presented on a control panel that is placed in a children's room, for example, and includes colors, fonts, graphics, and other visual modifications in the manner that the user interface elements are presented based on the context of the child's room. Hence, the underlying applications that execute on the control panels are largely if not entirely similar, while the user interface adapts readily to the needs of a particular user.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A control unit for a home automation system comprising:
    computing resources configured to execute application code on the control unit;
    context information stored in the control unit;
    a display presenting a graphical user interface;
    a plurality of interactive user interface elements presented on the graphical user interface such that a single user interface element can simultaneously display information about the context as well as implement behavior to send messages to a controlled system that can affect change in the displayed information;
    wherein the context information comprises state information known to the control unit, which includes context-specific state information known to a particular control unit as well as global context information known to multiple or all control units in a system.

2. The control unit of claim 1 wherein the context information comprises a temperature.

3. The control unit of claim 1 wherein the context information comprises a security system arming status.

4. The control unit of claim 1 wherein the context information comprises a volume control.

5. The control unit of claim 1 wherein the context information comprises a light level.

6. The control unit of claim 1 wherein the controlled system information comprises an HVAC system.

7. The control unit of claim 1 wherein the controlled system information comprises a lighting subsystem.

8. The control unit of claim 1 wherein the graphical user interface elements include background elements, passive elements, information display elements that present information from application software operating on the control unit, and control elements that cause application software operating on the control unit to initiate programmed behaviors.

9. The control unit of claim 8 wherein the user interface as a whole is contextually sensitive in that the appearance of user interface elements and/or the behavior of user interface elements are varied in a manner that is dependent on the context of the control unit.

10. The control unit of claim 1 wherein the behavior is implemented by interacting with a user interface element that simultaneously displays information about the state of a controlled subsystem.

11. The control unit of claim 1 wherein the controlled system information comprises an entertainment system.

12. A control unit for a home automation system comprising:
    memory storing context information;
    a display presenting a graphical user interface;
    a plurality of interactive user interface elements presented on the graphical user interface, wherein one or more of the user interface elements are displayed based on the stored context information and a current state of the control unit wherein each of the interface elements simultaneously display information based on the context information and are operable to implement behavior to end control messages to a controlled system;
    wherein the context information comprises state information defining the current state, the context information including context-specific state information known to the control unit and global context information for the home automation system.

13. The control unit of claim 12, wherein the graphical user interface elements include background elements, passive elements, information display elements that present information from application software operating on the control unit, and control elements that cause application software operating on the control unit to initiate programmed behaviors.

14. The control unit of claim 12 wherein the user interface as a whole is contextually sensitive in that the appearance of user interface elements and/or the behavior of user interface elements are varied in a manner that is dependent on the context of the control unit.

15. The control unit of claim 12, wherein the context information comprises a temperature, a security system arming status, a volume control, or a light level.

16. A home automation system with contextual control, comprising:
    a first control unit operating with a first set of context information, comprising:
        computing resources configured to execute application code on the control unit;
        a display presenting a graphical user interface;
        a plurality of interactive user interface elements presented on the graphical user interface such that each of the user interface elements simultaneously displays information based on the first set of context information and implements behavior to send messages to a controlled system that can affect change in the displayed information;

a second control unit operating with a second set of context information, comprising:
   computing resources configured to execute application code on the control unit;
   a display presenting a graphical user interface;
   a plurality of interactive user interface elements presented on the graphical user interface such that each of the user interface elements simultaneously displays information based on the second set of context information and implements behavior to send messages to a controlled system that can affect change in the displayed information;
wherein the first and second sets of context information differ such that for a particular operating state of the first and second control units the displayed information for at least one of the user interface elements differs based on the context information for the particular control unit.

17. The system of claim 16, wherein the context information comprises state information known by the first control unit and state information known by the second control unit, the state information comprising context-specific state information known to a particular one of the first and second control units and comprising global context information known to both the first and second control units.

18. The system of claim 16, wherein the first and second control units are positioned in first and second rooms of a single building.

19. The system of claim 16, wherein the first set of context information is associated with a first operator of the home automation system and the second set of context information is associated with a second operator of the home automation system.

* * * * *

UNITED STATES PATENT AND TRADEMARK OFFICE
CERTIFICATE OF CORRECTION

| | | |
|---|---|---|
| PATENT NO. | : 7,047,092 B2 | Page 1 of 1 |
| APPLICATION NO. | : 10/820426 | |
| DATED | : May 16, 2006 | |
| INVENTOR(S) | : William Wimsatt | |

It is certified that error appears in the above-identified patent and that said Letters Patent is hereby corrected as shown below:

Column 16, line 31, In Claim 12, replace "end" with --send--.

Signed and Sealed this
Third Day of July, 2012

David J. Kappos
*Director of the United States Patent and Trademark Office*